Nov. 29, 1960 M. ALDEN 2,962,340

FLEXIBLE SUPPORT FOR RECORDER SCANNING ELEMENT

Filed June 8, 1956 4 Sheets-Sheet 1

Inventor
Milton Alden
by Roberts, Cushman & Grover
Att'ys

FLEXIBLE SUPPORT FOR RECORDER SCANNING ELEMENT
Filed June 8, 1956 4 Sheets-Sheet 2
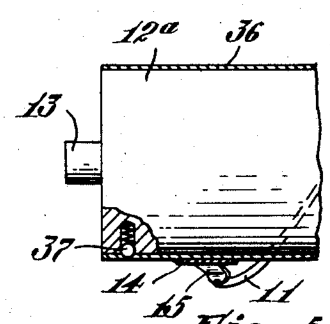
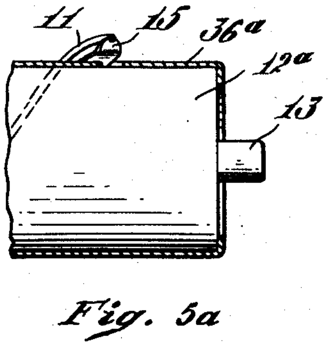
Fig. 5 Fig. 5a
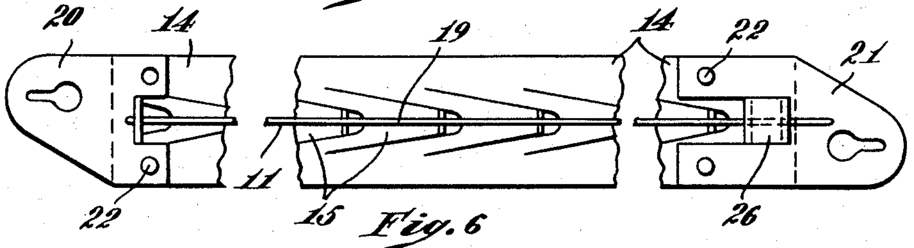
Fig. 6
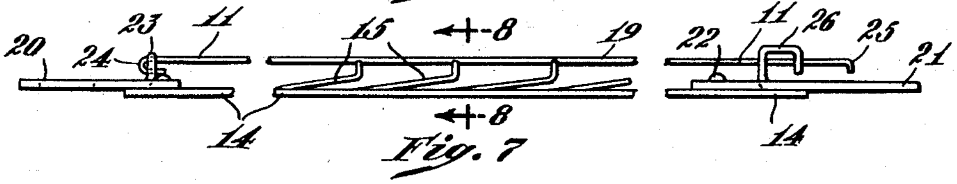
Fig. 7
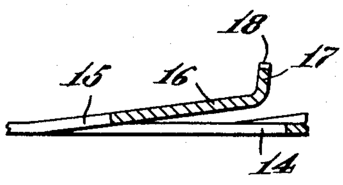
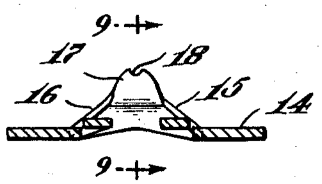
Fig. 9 Fig. 8
Inventor
Milton Alden
by Roberts, Cushman & Grover
Att'ys

FLEXIBLE SUPPORT FOR RECORDER SCANNING ELEMENT

Filed June 8, 1956 4 Sheets-Sheet 3

Inventor
Milton Alden
by Roberts, Cushman & Grover
Attys

Nov. 29, 1960 M. ALDEN 2,962,340

FLEXIBLE SUPPORT FOR RECORDER SCANNING ELEMENT

Filed June 8, 1956 4 Sheets-Sheet 4

Inventor
Milton Alden
by Roberts, Cushman & Grover
Att'ys

United States Patent Office 2,962,340

Patented Nov. 29, 1960

2,962,340

FLEXIBLE SUPPORT FOR RECORDER SCANNING ELEMENT

Milton Alden, Needham, Mass.
(% Alden Products Co., 117 N. Main St., Brockton, Mass.)

Filed June 8, 1956, Ser. No. 590,134

22 Claims. (Cl. 346—101)

This application is a continuation in part of my copending application Serial No. 167,980, filed June 14, 1950, now United States Patent No. 2,776,183, granted Jan. 1, 1957.

The present invention relates to the art of recording graphic and other signals such as facsimile or code messages, and more specifically to a resilient support for recorder elements used to scan paper or like recording media.

For example, in facsimile recording on media such as heat, pressure or electro-sensitive paper, a strip of the paper is fed lengthwise between and in contact with a linear electrode extending transversely of the strip and an opposed electrode usually helically carried on the periphery of a rotating drum. As the helical electrode is rotated it presses the paper against the linear electrode at a point which moves along the linear electrode. As the helical electrode thus transversely scans the paper strip, signals applied across the two electrodes mark the paper at the moving pressure point.

With recorders of the type having a scanning element in contact with the paper it is necessary to control the pressure of contact very closely. If the pressure is too low the recording will be weak; if it is too high the paper may be damaged by abrasion, particularly if the paper is weak, as in the case of moist electrolytic paper, or if the helical electrode is rotated rapidly, as in high speed facsimile recording. At speeds now as high as 3600 r.p.m. the scanning electrode of a conventional recorder tends to flutter or vibrate and damage the recording paper.

Accordingly, the main object of the present invention is to provide a simple, exchangeable support for the scanning electrode or like element which accommodates variations in pressure.

Another object is to provide a support which will control the pressure applied by the linear and helical electrodes to the paper by precise predetermination of the spacing between and the depth to which the helical electrode may penetrate the paper.

According to the invention the support for the recorder scanning element comprises a recorder drum, and carried by the drum resilient mounting means for the scanning element, the mounting means including a plurality of separate, spaced members extending outwardly of the drum, the members having outer portions for yieldingly supporting the scanning element spaced adjustable relative to the drum at spaced locations around the drum.

Further according to the invention the support comprises a sheet of flexible material adapted to be disposed in curved form around a recorder drum, and a plurality of spring means spaced along one side of the sheet and extending away from the sheet for flexing inwardly and outwardly thereof, the spring means having an outer portion for resiliently holding the scanning element adjustably spaced from the sheet dependent upon pressure on the scanning element. The sheet may be in strip or tubular form, and preferably carries attaching means for respectively engaging the ends of the scanning elements so as to hold these scanning elements in engagement with the aforesaid spring means, the attaching means including means slidingly receiving one end of the scanning element to allow lengthwise movement of the element relative to the series of spring means. The spring means may be in the form of leaf spring fingers extending in a series along the sheet. The support may be in the form of an elongate strip adapted to slide endwise into a slot on the periphery of the drum.

Preferably the support is provided with hold-down means overlying the spring means so as to engage an outwardly facing abutment on the spring means thereby to limit outward flexing of the spring means. The hold-down means may be in the form of a second strip carried by the aforesaid strip having the spring means or may be formed integrally with the strip that carries the spring means or integrally with the drum. Preferably the hold-down means comprises a series of hold-down members each of which engages the outwardly facing abutment of one of the spring means, and may be in the form of a bridge straddling the spring means, and if desired engaging it laterally so as to position the spring means laterally of the sheet on which it is carried.

For the purpose of illustration typical embodiments of the invention are shown in the accompanying drawings, in which Fig. 1 is a vertical end section on line 1—1 of Fig. 2 of a facsimile recorder;

Figure 10:
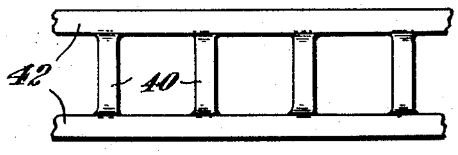
Figure 11:
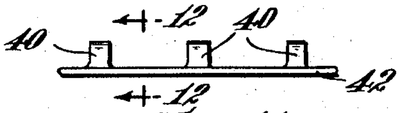
Figure 12:
Figure 13:
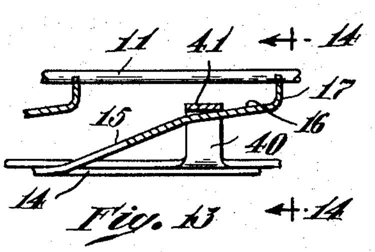
Figure 14:
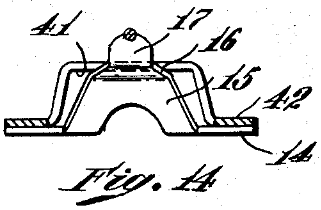
Figure 15:
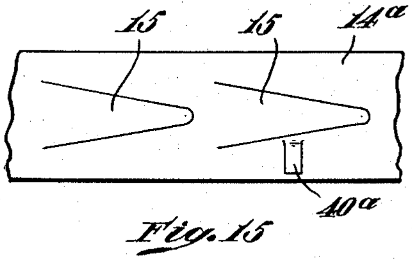
Figure 16:
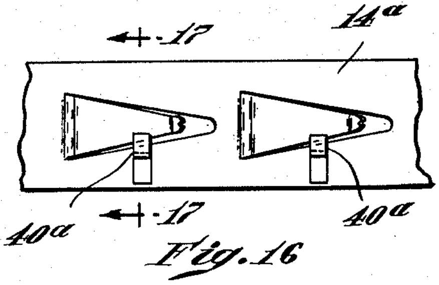
Figure 17:
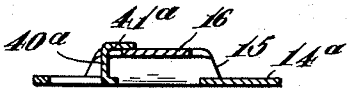
Figure 18:
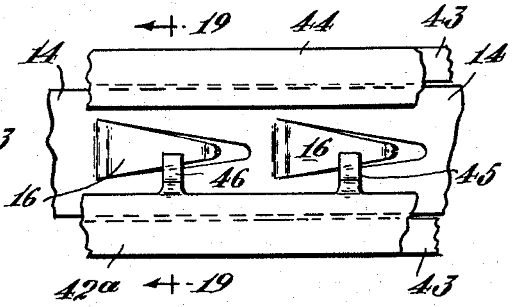
Figure 19:
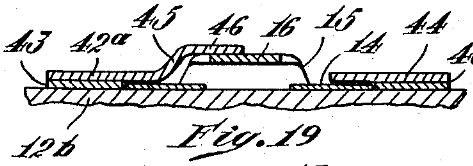
Figure 20:
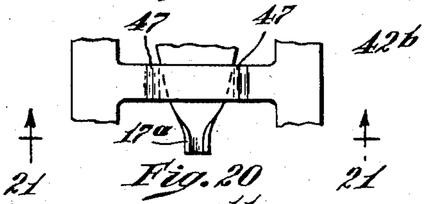
Figure 21:
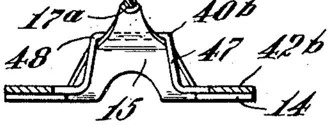
Figure 22:
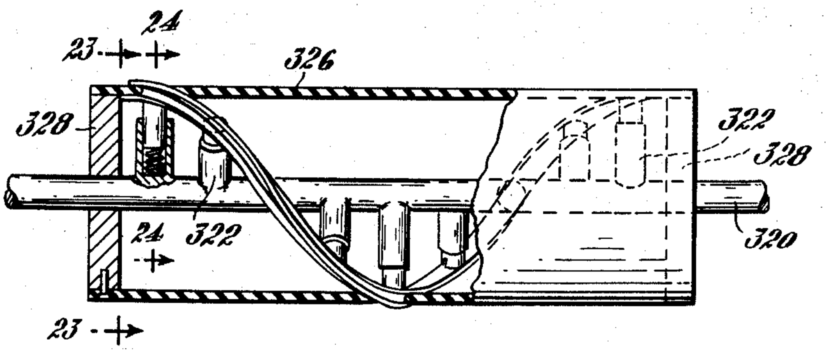
Figure 23:
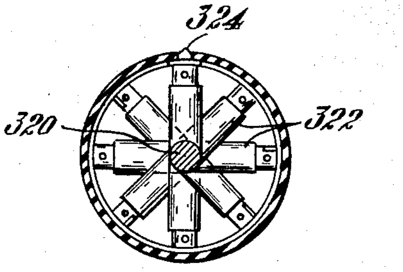

Figs. 5 and 5*a* are front elevations of two modified embodiments of the recorder drum;

Fig. 6 is a plan view of one form of scanning electrode support;

Fig. 7 is a side elevation of the support of Fig. 6;

Fig. 8 is a section on line 8—8 of Fig. 7;

Fig. 9 is a section on line 9—9 of Fig. 8;

Fig. 10 is a plan view of the hold-down strip;

Fig. 11 is a side elevation of the hold-down strip;

Fig. 12 is a section on line 12—12 of Fig. 11;

Fig. 13 is a section like that of Fig. 9 showing an assembled electrode, supporting strip and hold-down strip;

Fig. 14 is a section on line 14—14 of Fig. 13;

Figs. 15 and 16 are plan views showing the steps in the manufacture of a modified support and hold-down strip;

Fig. 17 is a section on line 17—17 of Fig. 16;

Fig. 18 is a plan view of another modified assembly of electrode support and hold-down strip;

Fig. 19 is a section on line 19—19 of Fig. 18;

Fig. 20 is a plan view of a further modified electrode support and hold-down strip;

Fig. 21 is a section on line 21—21 of Fig. 20;

Fig. 22 is a side elevation partly in section showing a further embodiment of a drum and electrode support;

Fig. 23 is a section on line 23—23 of Fig. 22; and

Figure 24:
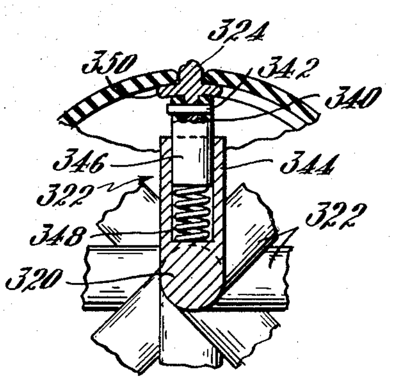

Fig. 24 is a section on line 24—24 of Fig. 22.

Figure 1:
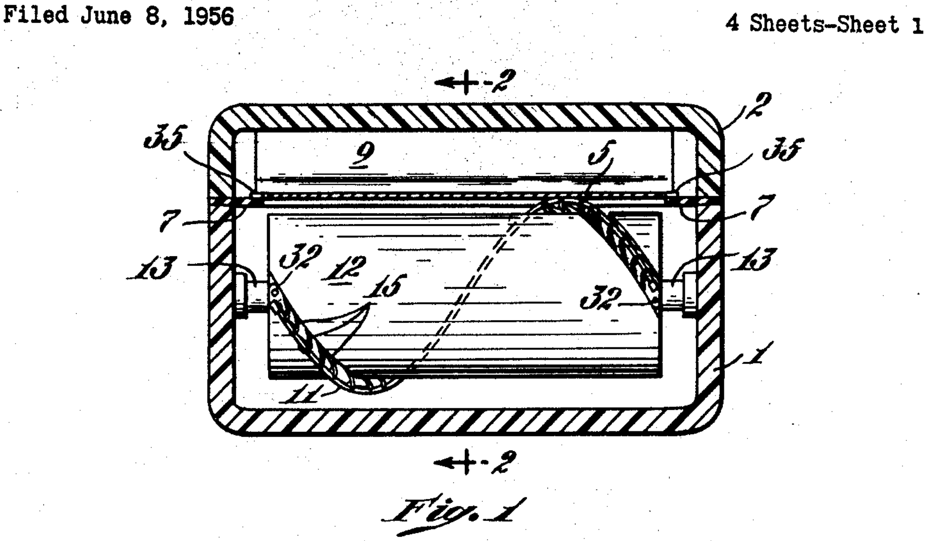
Figure 2:
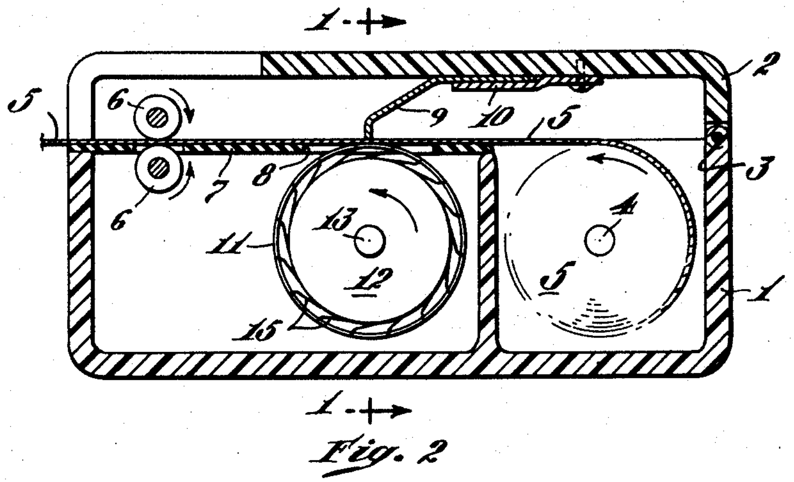
Fig. 2 is a vertical side section on the line 2—2 of Fig. 1.
Figure 3:
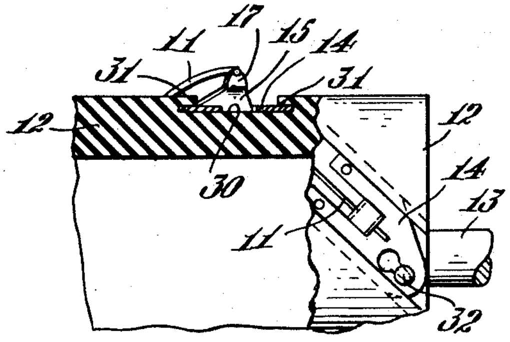
Fig. 3 is a fragmentary front view of a recorder drum shown partly in section.
Figure 4:
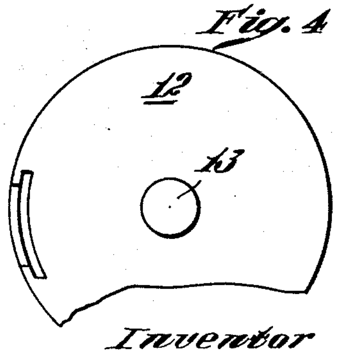
Fig. 4 is an end view of the drum of Fig. 3.

Shown in Figs. 1 and 2 is a facsimile recorder comprising a base 1 having a cover 2 hinged thereto. Within the base 1 is a compartment 3 containing a spindle 4 for a roll of recording paper 5. A pair of feed rolls 6 draws the paper from the compartment 3 over a platen 7 having an opening 8 therein. At the opening 8 the paper 5 passes between a linear, flexible blade electrode 9 supported by a clamp 10 on the cover 2 and a helical electrode 11 supported on a drum 12 rotating on a spindle 13. The feed roll 6 and drum 12 are motor driven in the direction indicated by arrows. As is well known in the art electrical signals applied across the two electrodes will mark successive transverse lines on recording paper as it is drawn between the electrodes.

One form of the invention for supporting the helical electrode 11 on the drum 12 is shown in Figs. 1 to 4 and Figs. 6 to 9, wherein the support comprises a strip 14 of thin, flexible metal such as Phosphor bronze or stainless steel. Along the strip 14 a series of spring fingers 15 are struck up from the strip. The spring fingers 15 extend generally lengthwise of the strip and comprise an intermediate portion 16 forming an upwardly facing abutment and an outer portion 17 having a shallow notch 18 for receiving a wire 19 which forms the scanning electrode. By virtue of the thinness and resiliency of the strip 14 the narrow fingers 15 are able to flex freely toward and away from the strip 14 without materially adding to the inertia of the wire 19. The spring fingers 15 may be die cut continuously along a continuously fed metal strip from a roll, and the necessary length cut from the roll; subsequently the fingers are bent upwardly from the strip except for the fingers at the end of the cut strip which are left flat so that end plates 20 and 21 may be attached to the strip 13 by rivets 22. Bent upwardly from the left end plate 20 is a small lug 23 having two openings for receiving a hook 24 formed by the left end of the wire electrode 11. Bent upwardly from the righthand end plate 21 is a U-shaped electrode attaching means 26 having two aligned openings in parallel arms of the U for slidingly receiving the bent right end 25 of the electrode 11. The bent end 25 extends an appreciable distance beyond the attaching means 26 partly to compensate for the larger circumference around the drum which the wire 11 will encompass as compared with the strip 14, and partly to permit the wire to slide relative to the fingers 15 as the fingers flex.

Referring again to Figs. 1 to 4, the drum 12 has a helical slot 30 for receiving the strip 14, this slot being formed by shoulders 31 which overlie the strip 14 and hold it in helical form with the fingers 15 extending out of the slot and supporting the wire electrode 11 at their outer portions 17. To secure the strip 14 against lengthwise movement in the slot screws 32 are attached to the drum through openings at the ends of the strip.

With the strip and electrode so attached to the drum and the drum spindles 13 mounted in the recorder base 1, the electrode 11 will be resiliently urged against the paper strip 5 and blade electrode 9. As the drum 12 is rotated, the point at which the helical electrode 11 presses the paper against the linear electrode 9 will repeatedly traverse the recording edge of the blade 9. The blade 9 as shown comprises a flexible sheet of metal, although the loop electrode of my U.S. Patent No. 2,621,999 and similar linear electrodes are equally effective. In any case the electrode is yieldingly urged against adjustable stops 35 carried on the platen 7 over which the paper is fed. The position of the recording edge in contact with the paper may be adjusted relative to the helical electrode by varying the height of the stops above the platen. The spacing between the blade and helical electrode is thus adjusted so that the pressure point of the helical electrode penetrates the average thickness of the paper approximately six ten-thousandths of an inch.

If any irregularity in the paper or blade is encountered by the pressure point of the helical electrode 11, the helical electrode will yield on its resilient support and avoid damage to the paper. Ordinarily, however, only one of the fingers will yield, and since the mass which yields is little more than that of the helical wire electrode itself the helical electrode does not tend to flutter after having passed an irregularity, also any tendency for the electrode to vibrate is substantially damped by the sliding of the electrode along the fingers 15.

The strip 14 and helical electrode 11 may be very simply removed by detaching the screws 32 and sliding the strip 14 from the drum slot 30. Similarly the helical electrode 11 may be replaced by straightening the bent end 25 of the electrode and sliding it from the supporting strip 14.

Alternatively, as shown in Fig. 5, the strip 14 may be permanently attached to a sleeve 36 fitting over a plain drum 12*a* to which the sleeve is secured by a spring tension 37. Or as shown in Fig. 5*a*, the spring fingers 15 may be integrally formed with the tubular sleeve 36*a*. In either case, the sleeve may be readily detached by sliding it from the drum 12*a*.

Where it is desired to control the outward flexing of the spring fingers 15 a series of hold-down members 40 (having a downwardly facing abutment 41) are disposed so as to engage the upwardly facing intermediate portion 16 of the spring fingers 15. As shown in Figs. 10 to 14, the hold-down members 40 are carried on a strip 42 adapted to overlie the electrode supporting strip 14 and straddle the spring fingers 15. The hold down members 40 permit the spring members 15 to flex inwardly and relieve pressure on the recording paper, but nevertheless control the outward pressure with which the electrode 11 carried by the spring fingers may penetrate the recording paper. The strips 14 and 42 may be inserted in the helical drum slot in the same manner as the single strip 14.

In Fig. 15 a modified hold-down member 40*a* is formed integrally with the drum supporting strip 14*a*. The hold-down members may be die-cut in the support strip 14, similarly as are the electrode supporting fingers 15. After being cut from the strip 14*a* the hold-down members 40*a* are bent upward and over the intermediate portion of the spring fingers 15 so as to form a downwardly facing abutment 41*a* engaging the upper side of the spring finger portion 16.

The hold-down member may also be formed integrally with a strip 42*a* which with an underlying strip 43 is permanently attached to a modified drum 12*b* so as to form a slot for receiving the support strip 14. As shown in Figs. 18 and 19, the slot forming strip 42*a* has a hold-down member 45 extending over the portion 16 of the spring finger 15 to form a downwardly facing abutment 46. On the opposite side of the strip 14 from the hold-down 45 a plain strip 44 may overlie the strip 43 to form the opposite side of the slot, or a strip similar to 42*a* may be used.

As shown in Figs. 20 and 21, the hold-down member may be formed so as to engage the sides as well as the outwardly facing portion of the spring fingers. The hold-down strip 42*b*, similarly to strips 42 of Figs. 10 to 14, has vertical arms 47 supporting an abutment portion 48, the arms tapering upwardly to the width of the adjacent portion of an intermediate spring 17*a* so to engage the spring fingers edgewise, as shown. With this arrangement both outward and sidewise flexing of the fingers is controlled. Figs. 20 and 21 also illustrate a modified electrode receiving portion wherein the tip of the finger is die pressed to form a trough 17*a*.

It is also possible to support the helical conductor by resilient means which are not mounted externally of the drum structure. For example, the recording element shown in Figs. 22 through 24 comprises a shaft 320 having radially projecting therefrom a plurality of spokes 322 at whose outer ends is carried a strip 324. The strip 324 shown in Fig. 24 is made of metal and the separate conductor as such eliminated. The spokes 322 are arranged about the shaft 320 and protrude out through a helical slot in the periphery of a cylinder 326 of rigid insulating material so that the strip 324 makes one helical turn. The ends of the cylinder 326 are closed to form a drum by means of heads 328 which are supported upon the shaft 320.

As is best shown in Fig. 24, the strip 324 is attached to the ends of the spokes 322 by tabs 340 each of which tabs is pivotally held in a slot in the end of a respective spoke by means of a pin 342. To permit deflection of the strip 324 each of the spokes 322 is in the form of a snubber or shock absorber comprising outer and inner telescoping members 344 and 346. The inner member 346 is biased outwardly by a spring 348, its travel being limited by a flange 350 extending from the strip 324 which flange contacts the inner surface of the cylinder 326.

The spokes 322 need not be mechanical snubbers but can be made of rubber or other resilient material having similar physical properties.

I claim:

1. A support for positioning a recorder scanning element, comprising a recorder drum, and carried by the drum resilient mounting means for said element including a plurality of separate, spaced members extending outwardly of the drum, said members respectively having resilient outer portions for yieldingly supporting the scanning element adjustably spaced from the drum, said members being attached to the drum at spaced locations curved around the drum, said outer portions being unobstructed for inward radial movement.

2. A support for positioning a recorder scanning element comprising a recorder drum, and resilient mounting means for said element including a plurality of separate, spaced resilient members for supporting the element at spaced locations throughout its length at the outer end of said members respectively, said members being attached to the drum at locations curved around the drum, thereby yieldingly to support spaced portions of the element adjustably spaced from the drum, said outer ends being unobstructed for inward radial movement.

3. A support for positioning a recorder scanning element comprising a recorder drum, and resilient mounting means for said element including a plurality of separate, spaced resilient members for supporting the element at spaced locations throughout its length at the outer end of said members respectively thereby yieldingly to support spaced portions of the element adjustably spaced from the drum, and means on the drum holding said resilient means curved around the drum, said outer ends being unobstructed for inward radial movement.

4. A support for positioning a recorder scanning element comprising a recorder drum, and resilient mounting means for said element including a plurality of separate, spaced resilient members for supporting the element at spaced locations throughout its length at the outer end of said members respectively thereby yieldingly to support spaced portions of the element adjustably spaced from the drum, and a recess in the drum for holding the resilient means in curved form around the drum, said outer ends being unobstructed for inward radial movement.

5. A support for positioning a scanning element in curved form on the periphery of a recorder drum, comprising a sheet of flexible material adapted to be disposed around a drum, a series of spring means spaced at intervals along one side of said sheet and extending away from the sheet for flexing inwardly and outwardly thereof, each of said means having an outer portion for resiliently holding a scanning element adjustably spaced from the sheet dependent upon pressure on said element, and attaching means on the sheet respectively engaging the ends of the scanning element for holding it in engagement with said spring portions, said attaching means including means slidingly receiving one end of the element to allow lengthwise movement of the element relative to said series as said spring means flex.

6. A support for positioning an elongate scanning element in curved form on the periphery of a recorder drum, comprising an elongate strip of flexible sheet material adapted to be warped around the drum, a plurality of spring means spaced at intervals lengthwise of the strip along one side thereof and extending away from the strip for flexing inwardly and outwardly thereof; each of said spring means having an outer portion for resiliently holding a scanning element adjustably spaced from the strip dependent upon pressure on said element, and means at the ends of the strip for engaging the scanning element to hold it on the strip including means slidingly receiving one end of the element to allow lengthwise movement of the element relative to the strip as the strip is warped and as said spring means flex.

7. A scanning assembly for a recorder drum, comprising a flexible wire electrode, a sheet of flexible material adapted to be disposed in curved form around the drum, a series of spring means spaced at intervals along one side of said sheet and extending away from the sheet for flexing inwardly and outwardly thereof, each of said means having an outer portion for resiliently holding said electrode adjustably spaced from the sheet dependent upon pressure on said electrode, and attaching means on the sheet respectively engaging the ends of the electrode for holding it in engagement with said spring portions, said attaching means including means forming an aperture slidingly receiving one end of the element to allow lengthwise movement of the element relative to said series as said spring means flex.

8. A support for positioning a scanning element in curved form on the periphery of a recorder drum, said member comprising, a tube of flexible sheet material adapted to be telescoped over said drum and having a series of spaced spring means extending away from the sheet for flexing inwardly and outwardly from the sheet, each of said means having an outer portion for resiliently holding a scanning element adjustably spaced from the sheet depending on pressure on said element.

9. A scanning assembly for a recorder drum, comprising an elongate flexible scanning element and a sheet of flexible material adapted to be attached in curved form around a drum, said sheet having a plurality of spring means spaced at intervals along one side of said sheet and extending away from the sheet for flexing inwardly and outwardly thereof, each of said means having an outer portion for resiliently holding said element adjustably spaced from the sheet dependent upon pressure on said element, said element being attached to said sheet and engaging said spring means thereby to form a replacement unit for attachment to said drum.

10. A scanning assembly for a recorder drum, comprising a wire electrode and a sheet of flexible material adapted to be attached in curved form around a drum, said sheet having a plurality of spring means spaced at intervals along one side of said sheet and extending away from the sheet for flexing inwardly and outwardly thereof, each of said means having an outer portion with a notch for resiliently holding said electrode adjustably spaced from the sheet dependent upon pressure on said element, said element being attached to said sheet and engaging said spring means thereby to form a replacement unit for attachment to said drum.

11. A support for a recorder scanning element comprising a drum, an elongate flexible scanning element, a sheet of flexible material adapted to be disposed about the drum, said sheet having a plurality of spring means spaced at intervals along one side of the sheet and extending away from the sheet for flexing inwardly and outwardly thereof, each said spring means having an outer portion for resiliently holding said element adjustably spaced from the sheet, and means for attaching the sheet to the drum in curved form, said element being attached to said sheet and engaging said spring means thereby to form a replacement unit for attachment to said drum.

12. A support for a recorder scanning element comprising an elongate strip of flexible sheet material, a plurality of spring means spaced at intervals lengthwise of the strip along one side thereof and extending away from the strip for flexing inwardly and outwardly thereof, each of said spring means having an outer portion for resiliently holding a scanning element adjustably spaced from the strip dependent upon pressure on said element, and a rotatably mounted drum comprising means on the periphery of the drum forming a slot with a ledge overlying the strip, for holding the strip in curved form on the periphery of the drum, said slot opening at one end of the drum to admit the strip endwise therein.

13. A support for a recorder scanning element, comprising a recorder drum, an elongate strip of flexible sheet material adapted to be warped around the drum, a plurality of spring means spaced at intervals lengthwise of the strip along one side thereof and extending away from the strip for flexing inwardly and outwardly thereof, each of said spring means having an outer portion for resiliently holding a scanning element adjustably spaced from the strip dependent upon pressure on said element and an abutment intermediate said outer position and said sheet and facing outwardly of the sheet, and a second strip of flexible sheet material attached to the drum and forming a slot with a ledge overlying the first said strip and having a series of hold-down members spaced along the second strip, each of said members extending over one of said abutments so as to engage the abutment and limit outward flexing of the spring means.

14. A support for positioning a scanning element in curved form on the periphery of a recorder drum, comprising a sheet of flexible material adapted to be disposed around a drum, a plurality of spring means spaced at intervals along said sheet and extending away from the sheet for flexing inwardly and outwardly thereof, each of said means having an outwardly facing abutment and an outer portion for resiliently holding a scanning element adjustably spaced from the sheet, and hold-down means overlying said spring means so as to engage said abutments, thereby to limit outward flexing on one of said spring means.

15. A support for positioning a scanning element in curved form on the periphery of a recorder drum, comprising an elongate strip of flexible sheet material adapted to be disposed around the drum, a plurality of spring means spaced at intervals lengthwise of the strip along one side thereof and extending away from the strip for flexing inwardly and outwardly thereof, each of said spring means having an outer portion for resiliently holding a scanning element adjustably spaced from the strip dependent upon pressure on said element and an abutment intermediate said outer position and said sheet and facing outwardly of the sheet, and a second strip of flexible sheet material overlying the first said strip and having a series of hold-down members spaced along the second strip, each of said members extending over one of said abutments so as to engage the abutment and limit outward flexing of the spring means.

16. A support for positioning a scanning element in curved form comprising a recorder drum, a sheet of flexible material adapted to be disposed around the periphery of the drum, a plurality of spring means spaced at intervals along said sheet and extending away from the sheet for flexing inwardly and outwardly thereof, each of said means having an outwardly facing abutment and an outer portion for resiliently holding a scanning element adjustably spaced from the sheet, and hold-down means attached to the drum and disposed to engage said abutments, thereby to limit outward flexing of one of said spring means.

17. A support for positioning a scanning element in curved form on the periphery of a recorder drum, comprising a sheet of flexible material adapted to be disposed around a drum, a series of leaf spring fingers spaced at intervals along said sheet and extending lengthwise of the series and away from the sheet for flexing inwardly and outwardly thereof, each of said fingers having an outwardly facing abutment and an outer portion for resiliently holding a scanning element adjustably spaced from the sheet, and a series of hold-down members each disposed to engage one of said abutments, thereby to limit outward flexing of said spring means.

18. A support for positioning a scanning element in curved form on the periphery of a recorder drum, comprising a sheet of flexible material adapted to be disposed around a drum, a plurality of spring means spaced at intervals along one side of the sheet for flexing inwardly and outwardly thereof, each of said spring means having an outer portion for resiliently holding a scanning element adjustably spaced from the sheet, and said spring means each having an abutment intermediate said outer portion and said sheet and facing outwardly from the sheet, and for each of said spring means a hold-down member formed integral with said sheet and extending outwardly of the abutment so as to engage the abutment and limit outward flexing of each of said spring means.

19. A support for positioning a scanning element in curved form on the periphery of a recorder drum, comprising a strip of flexible material adapted to be disposed around a drum, a plurality of spring means spaced at intervals along said sheet and extending away from the sheet for flexing inwardly and outwardly thereof, said means having an outwardly facing abutment and an outer portion for resiliently holding a scanning element adjustably spaced from the sheet, and a strip of flexible material overlying the first said strip and having a series of hold-down members each disposed to engage one of said abutments, thereby to limit outward flexing of one of said spring means.

20. A support for positioning a scanning element in curved form on the periphery of a recorder drum, comprising a sheet of flexible material adapted to be disposed around a drum, a plurality of spring means spaced at intervals along said sheet and extending away from the sheet for flexing inwardly and outwardly thereof, each of said means having an outwardly facing abutment and an outer portion for resiliently holding a scanning element adjustably spaced from the sheet, and a series of holddown members each disposed to engage one of said abutments thereby to limit outward flexing of one of said spring means, each of said members comprising a bridge straddling one of said spring means.

21. The support according to claim 16 characterized in that each of said bridge members comprises portions extending away from said sheet so as to engage the sides of each spring means and position it laterally.

22. A recorder scanning assembly comprising a drum, an elongate, flexible scanning element extending around the drum, means on the drum slidingly positioning the scanning element on the drum, and attaching means fixed relative to the drum respectively engaging the ends of the scanning element to hold the element in engagement with the positioning means, said attaching means including means slidingly receiving one end of the element to allow lengthwise movement of the element as said element flexes on rotation of the drum.

References Cited in the file of this patent

UNITED STATES PATENTS

| | | |
|---|---|---|
| 1,848,937 | Coventry | Mar. 8, 1932 |
| 1,929,099 | Williams | Oct. 3, 1933 |
| 2,084,828 | Jeetor | June 22, 1937 |
| 2,131,547 | Artzt | Sept. 27, 1938 |
| 2,380,467 | Ressler | July 31, 1945 |
| 2,568,754 | Lupish | Sept. 25, 1951 |
| 2,680,056 | Olden | June 1, 1954 |
| 2,785,943 | Turano | Mar. 19, 1957 |

FOREIGN PATENTS

| | | |
|---|---|---|
| 695,826 | France | Oct. 6, 1930 |